United States Patent
Bastin et al.

(10) Patent No.: US 9,624,665 B2
(45) Date of Patent: Apr. 18, 2017

(54) MULTILAYER SURFACE COVERING

(75) Inventors: Pierre Bastin, Wiltz (LU); Pascal Di Croce, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 0 days.

(21) Appl. No.: 14/388,150

(22) PCT Filed: Mar. 28, 2012

(86) PCT No.: PCT/EP2012/055514
§ 371 (c)(1),
(2), (4) Date: Sep. 25, 2014

(87) PCT Pub. No.: WO2013/143587
PCT Pub. Date: Oct. 3, 2013

(65) Prior Publication Data
US 2015/0056422 A1    Feb. 26, 2015

(51) Int. Cl.
| | | |
|---|---|---|
| *E04C 2/20* | (2006.01) | |
| *B05D 3/00* | (2006.01) | |
| *B05D 3/02* | (2006.01) | |
| *B05D 3/14* | (2006.01) | |
| *B32B 37/15* | (2006.01) | |
| *B32B 38/00* | (2006.01) | |
| *B32B 38/08* | (2006.01) | |
| *B05D 7/00* | (2006.01) | |
| *B05D 7/04* | (2006.01) | |

(52) U.S. Cl.
CPC ............. *E04C 2/20* (2013.01); *B05D 3/007* (2013.01); *B05D 3/0209* (2013.01); *B05D 3/144* (2013.01); *B05D 7/57* (2013.01); *B32B 37/153* (2013.01); *B32B 38/0008* (2013.01); *B32B 38/0036* (2013.01); *B32B 38/08* (2013.01); *B05D 7/04* (2013.01); *B32B 2310/14* (2013.01); *B32B 2398/20* (2013.01); *B32B 2419/04* (2013.01); *Y10T 428/24868* (2015.01)

(58) Field of Classification Search
None
See application file for complete search history.

(56) References Cited

U.S. PATENT DOCUMENTS

| | | | | |
|---|---|---|---|---|
| 5,698,621 A | * | 12/1997 | Nguyen | ............... C08J 5/18 524/127 |
| 6,495,266 B1 | * | 12/2002 | Migliorini | ............ B32B 27/32 264/173.14 |
| 2002/0136862 A1 | * | 9/2002 | Dong | ............ B32B 21/08 428/150 |
| 2011/0268937 A1 | * | 11/2011 | Schacht | ............ B44C 1/10 428/205 |

FOREIGN PATENT DOCUMENTS

| | | |
|---|---|---|
| EP | 1 820 639 A1 | 8/2007 |
| EP | 1 930 088 A1 | 6/2008 |
| WO | WO 2006/046009 A1 | 5/2006 |
| WO | WO 2011/034214 A1 | 3/2011 |
| WO | WO 2011/099638 A1 | 8/2011 |

* cited by examiner

*Primary Examiner* — Laura Powers
(74) *Attorney, Agent, or Firm* — Reinhart Boerner Van Deuren P.C.

(57) ABSTRACT

The present invention relates to a multilayer surface covering (1) comprising a PVC-free support layer (2), a decorative layer (5), a transparent wear layer (4) and a coating layer (3) between said support layer (2) and said decorative layer (5), said coating layer (3) having a thickness of at least 5 µm and a surface tension equal or higher to the surface tension of the decorative layer.

15 Claims, 4 Drawing Sheets

MULTILAYER SURFACE COVERING

FIELD OF THE INVENTION

The present invention relates to a multilayer surface covering comprising a support layer, a coating layer, a decorative layer and a wear layer, and to a method to produce such a surface covering.

PRIOR ART AND RELATED TECHNICAL BACKGROUND

Synthetic surface coverings, such as floor or wall coverings, are well known. Among them, multiple layer coverings usually comprise a lower layer known as "support layer", and an upper layer known as "wear layer". In opposition to other polymeric sheet materials, a floor or wall covering, and the different layers of a multiple layer covering has specific properties in terms of flexibility, mechanical and stain resistance.

The most known surface coverings are PVC-based coverings. However due to environmental issues, alternatives to PVC were developed to obtain PVC-free surface coverings.

Usually PVC-free surface coverings comprise a PVC-free support layer onto which a decorative layer can be easily applied.

However, PVC-free surface coverings present several drawbacks, among which a poor adherence between the PVC-free support layer and the decorative layer or the wear layer, and a poor printing quality due to unevenness of such support layer.

AIMS OF THE INVENTION

The present invention aims to provide a surface covering, and a process to produce it, which does not have the drawbacks of the prior.

The present invention aims to provide a surface covering which is an alternative to traditional PVC-based surface coverings.

The invention aims to provide a surface covering having an improved adherence between the different layers and a good printing quality.

SUMMARY OF THE INVENTION

The present invention discloses a surface covering comprising a PVC-free support layer, a decorative layer, a transparent wear layer and a coating layer between the support layer and the decorative layer, the coating layer having a thickness of at least 5 µm and a surface tension equal or higher to the surface tension of the decorative layer.

According to particular embodiments, the surface covering may comprise one, or a suitable combination of one or several, of the following characteristics:
- the coating layer has a surface tension which is at least 2 Dyne/cm (2 mN/m) higher than the surface tension of the decorative layer,
- the coating layer has a surface tension comprised between 34 dyne/cm (34 mN/m) and 38 dyne/cm (38 mN/m),
- the coating layer is a polymer-based film comprising coalesced Polyurethane (PU) particles or a polyolefin-based film comprising an ethylene-acrylic acid or an ethylene-methacrylic acid copolymer,
- the support layer comprises a thermoplastic composition comprising a styrenic thermoplastic elastomer or a polyolefin resin,
- the surface covering comprises a supplementary coating layer between the decorative layer and the wear layer, the supplementary coating layer having a thickness of at least 1 µm and a surface tension equal or higher to the surface tension of the decorative layer,
- the surface covering comprises a coating layer having a thickness of 5 µm and a supplementary coating layer having a thickness of 1 µm,
- the surface covering comprises a coating layer having a thickness of 10 µm and a supplementary coating layer having a thickness of 3 µm,
- the surface covering comprises a varnish layer.

The present invention relates to a process to produce a PVC-free surface covering according to the invention, said process comprising the steps of providing a PVC-free support layer, providing a coating layer composition, forming a coating layer having a thickness of at least 5 µm and a surface tension equal or higher to the surface tension of the decorative layer, by applying the coating layer composition over the PVC-free support layer and drying said coating layer composition at a temperature comprised between 20 and 130° C. or by extruding a coating layer composition to form a film and applying said film over said PVC-free support layer, applying over said coating layer a decorative layer, applying over said decorative layer a transparent wear layer.

According to particular embodiments, the process may comprise one, or a combination, of any of the following characteristics:
- the coating layer has a surface tension comprised between 34 dyne/cm (34 mN/m) and 38 dyne/cm (38 mN/m),
- the coating layer is formed by the coalescence of a PU-based dispersion,
- the process further comprises the step of forming a supplementary coating layer having a thickness of at least 1 µm and a surface tension equal or higher to the surface tension of the decorative layer, by applying a coating layer composition over the decorative layer and drying the coating layer composition at a temperature comprised between 20 and 130° C. or by extruding a coating layer composition to form a film and applying the film over the decorative layer,
- the process further comprises the step of applying a varnish layer over the wear layer,
- the process further comprises the step of performing a corona treatment on the support layer before forming the coating layer and/or on the wear layer before applying the varnish layer.

The terms "applying" and "applied" should be understood as covering any suitable process step wherein a layer is formed onto, or put in contact to, another layer. For example, it may refer to a calendering, a hot coating, a laminating step or a combination thereof.

DETAILED DESCRIPTION OF THE INVENTION

Figure 1:
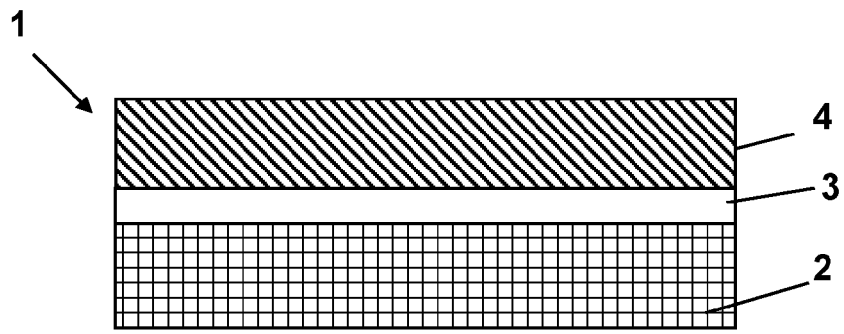
FIG. 1 represents schematically a first embodiment of the surface covering according to the invention.

The present invention relates to a multilayer surface covering 1 comprising a support layer 2, a wear layer 4 and, in between, a coating layer 3 (FIG. 1).

Figure 2:
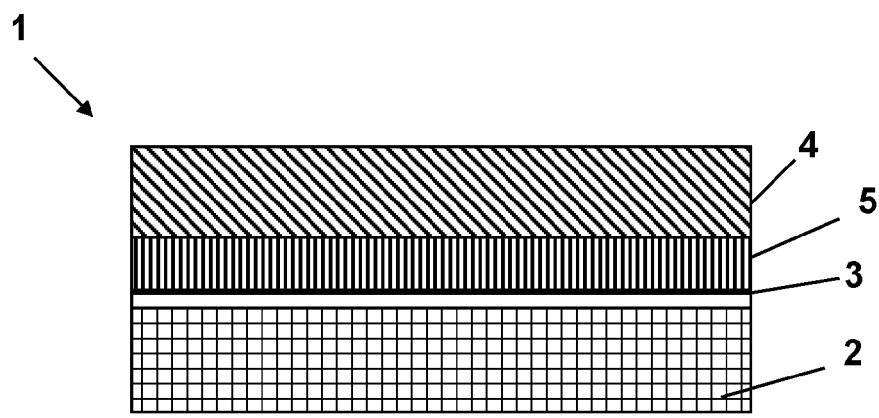
FIG. 2 represents schematically a second embodiment of the surface covering according to the invention.

The surface covering 1 may further comprises a decorative layer 5 between the support layer 2 and the wear layer 4 (FIG. 2). In this embodiment, the coating layer 3 is laid between the support layer 2 and the decorative layer 5 and the wear layer 4 is substantially transparent.

Figure 3:
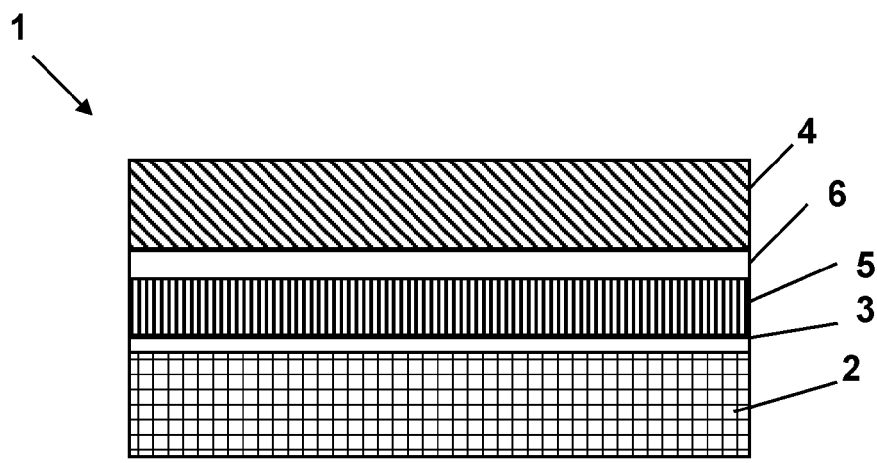
FIG. 3 represents schematically a third embodiment of the surface covering according to the invention.

In another embodiment, a coating layer 3 is laid between the support layer 2 and the decorative layer 5 and a supplementary coating layer 6 is laid between the decorative layer 5 and the wear layer 4 (FIG. 3).

Figure 4:
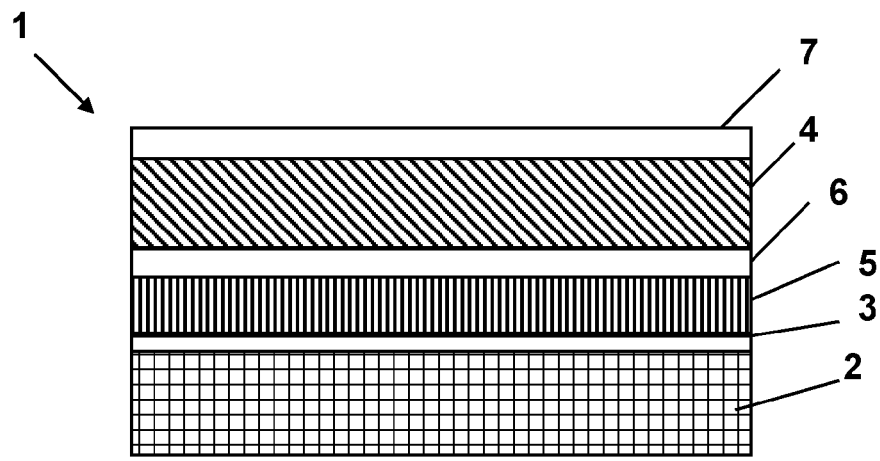
FIG. 4 represents schematically a forth embodiment of the surface covering according to the invention.
Figure 5:
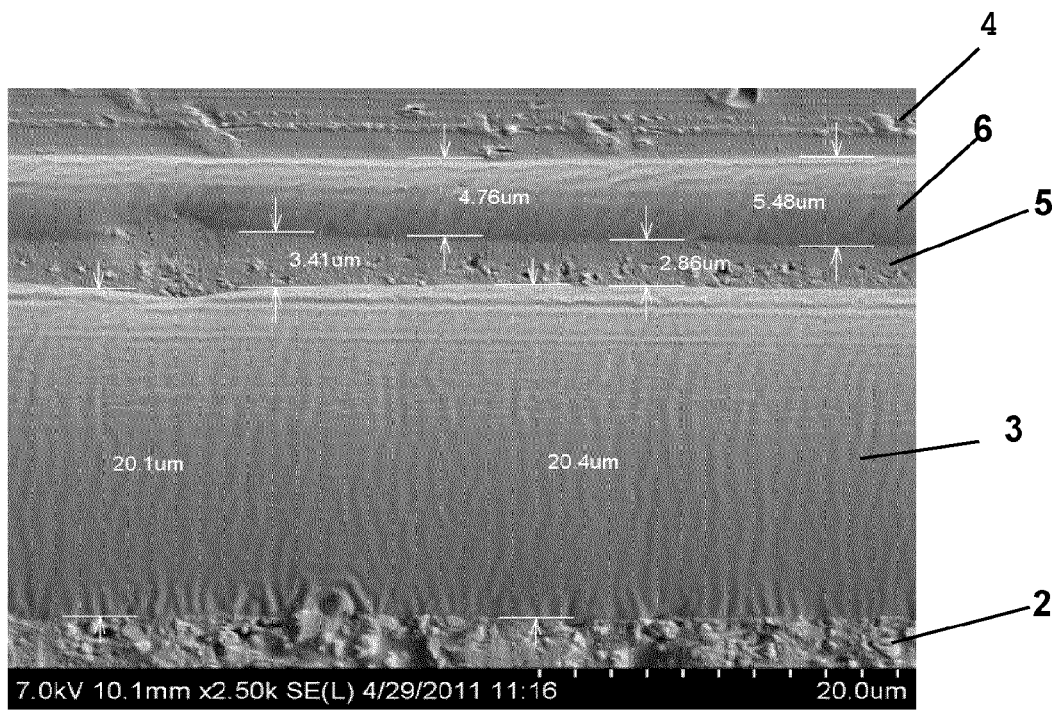
FIG. 5 represents an electronic microscopy image of a transversal cut of a surface covering according to the invention.
Figure 6:
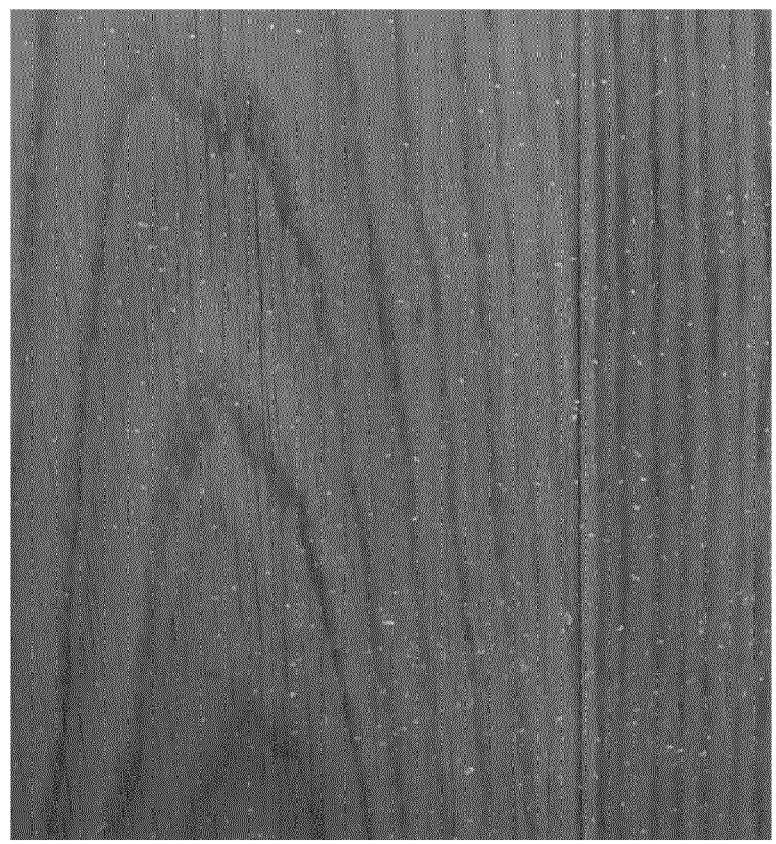
FIG. 6 is an upper view of a surface covering according to the prior art.
Figure 7:
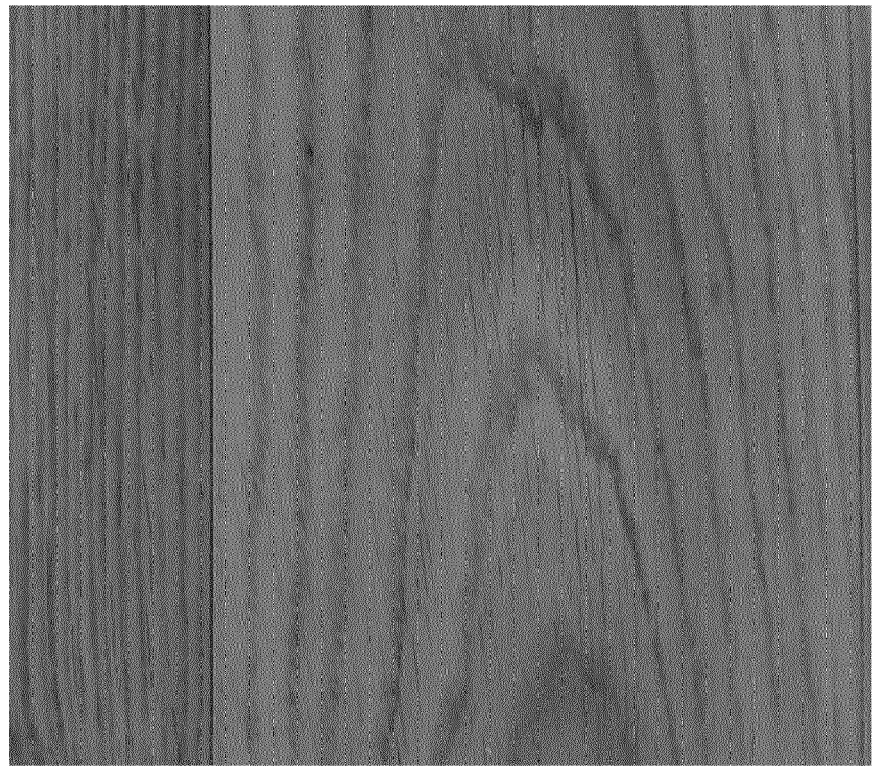
FIG. 7 is an upper view of the surface covering according to the invention.

In all the embodiments according to the invention, the surface covering 1 may further comprises a varnish layer 7 over the wear layer 4 (FIG. 4).

The support layer 2 is a PVC-free layer comprising a thermoplastic composition.

In a preferred embodiment, the thermoplastic composition comprises a styrenic thermoplastic elastomer, such as SBS (Styrene Butadiene Styrene), SIS (Styrene Isoprene Styrene) or the hydrogenated polymers SEBS (Styrene Ethylene butylenes Styrene), or SEPS (Styrene Ethylene Propylene Styrene) copolymers.

In another preferred embodiment, the thermoplastic composition comprises a polyolefin resin, or a combination of polyolefin resins.

Preferably, the polyolefin resin is selected from the group consisting of VLDPE, LLDPE, EVA, polyolefin plastomers (POP), polyolefin elastomers (POE) and a combination thereof. Preferably the polyolefin polymer has a MFI (at 190° C. under 2.16 kg weight) of between 0.6 and 3 g/10 min.

Concerning the definition of POE and POP we refer to the *Handbook of Plastics Elastomers and Composites*, Charles A. Harper, 4th edition, Mc Graw-Hill Handbooks, p 195. Elastomer and plastomer resins are defined as being elastomer when the content of octene monomer is less than 20%, and as being plastomer when the content of octene monomer is more than 20%. However, the POE and POP according to the invention may also be the ones obtained by replacing octene monomers by butene or hexene co-monomers.

The polyolefin elastomer or plastomers are disclosed in U.S. Pat. No. 5,272,236 and U.S. Pat. No. 5,278,272, the disclosures of which are incorporated herein by reference.

In a preferred embodiment, the composition of the support layer 2 is the one disclosed in PCT/EP2009/065993, which is incorporated by reference hereinto.

The composition of the support layer 2 may comprise at least one second polymer. Said second polymer comprises acid anhydride groups and represents at least 5 parts in weight, or 5% wt, preferably between 10 to 40 parts in weight, per 100 parts of the total amount of polymers.

The polymer comprising acid anhydride groups may be, for example, a polyethylene incorporating maleic anhydride monomers and having a density of around 0.94 g/cm$^3$ and a MFI (at 190° C. under 2.16 kg weight) of around 25 g/10 min, or a terpolymer of ethylene, butyl-acrylate and maleic anhydride, said terpolymer having a density of around 0.94 g/cm$^3$ and a MFI (at 190° C. under 2.16 kg weight) of around 5 g/10 min, or a polyolefin plastomer or elastomer, obtained by a metallocene catalysis and chemically modified to incorporate maleic anhydride, and having a density of around 0.88 g/cm$^3$ and a MFI (at 190° C. under 2.16 kg weight) of around 3.7 g/10 min, or an EVA polymer chemically modified to incorporate maleic anhydride, and having a density of around 0.96 g/cm$^3$ and a MFI (at 190° C. under 2.16 kg weight) of around 1.4 g/10 min.

Preferably, the composition of the support layer 2 further comprises at least 100 parts of at least one filler per 100 parts of the total amount of polymer or polymers.

The filler is preferably a mineral filler, for example $CaCO_3$, $MgCO_3$, $CaMgCO_3$, $SiO_2$, silicates, barium sulphates, alumina hydrates, magnesium hydrates or zinc borates.

The support layer 2 may also comprise additives such as thermal or light stabilizers, antistatic additives, processing additives, the type and the quantity of these additives being adapted to the process in particular to the type and quantity of component of the layer composition.

The composition may thus comprise 0.5 to 4 phr of stearic acid and/or 2 to 25 phr of a mineral oil.

The surface covering 1 may further comprise a glass veil. The glass veil may either be embedded in the support layer 2 or being a supplementary layer in contact with the support layer 2.

The support layer 2 has a thickness comprised between 500 and 3700 μm, more preferably around 1700 μm.

Preferably, the surface tension of the support layer 2 is lower than 32 mN/m, more preferably it is comprised between 28 to 32 mN/m.

The coating layer 3 according to the invention has a surface tension, measured at room temperature, which is equal or higher than the surface tension of the dried decorative layer 5.

The coating layer 3 provides adhesion between the support layer 2 and the decorative layer 5 and/or between the decorative layer 5 and the wear layer 4. It further allows getting a good printing quality in spite of defects which might be present in the surface of the support layer 2.

The surface tension is generally measured in Dyne/cm which corresponds to mN/m. Therefore, preferably, the surface tension, at room temperature, of the coating layer 3 is 2 Dyne/cm (2 mN/m), more preferably 4 Dyne/cm (4 mN/m) higher than the surface tension, at room temperature, of the decorative layer 5.

The coating layer 3 is a polymer-based film, either a liquid film obtained from an emulsion or dispersion of a polymer coated at room temperature or obtained from a polymer in solution in a solvent coated at room temperature, or either a hot liquid polymer, or either a film calendered or extruded.

Preferably, the coating layer 3 is compatible with the decorative layer 5, with the components of the decorative layer 5, i.e. with the ink, or inks, and/or the binder, or binders, and/or the additive or additives. Preferably, the components of the coating layer 3 may spread within the layers between which it has to provide adhesion, preferably over a thickness equal or higher then 1 μm.

In a preferred embodiment, the coating layer 3 comprises coalesced PU (Polyurethane) particles. The coating layer 3 is a film of a coalesced PU-based dispersion. The film is obtained by the coalescence of a PU-based dispersion comprising discreet PU particles.

"Coalesced" or "coalescence" refers to the union or combination of discreet particles in one body or mass by the evaporation of the solvent or water, i.e. the union by action of heat of discreet PU particles to form a film.

Preferably, the PU-based dispersion comprises PU (Polyurethane) which is dispersible in water or in organic solvent. Preferably, the polyurethane comprises aliphatic chains.

Preferably, the PU-based dispersion comprises between 20 to 40% wt, more preferably between 30 to 35% wt, of aliphatic PU in either an organic solvent or in water.

Preferably, the PU-based dispersion is an aqueous dispersion in which no organic solvent is used. In this embodiment, chemically modified polyurethane polymers could be used, such as those comprising stabilizing groups into their backbone, i.e. anionic, cationic and non-ionic stabilizing groups. In this embodiment, the water content is comprised between 60 and 80% wt.

"Dispersion" means generally a two phase system where one phase contains discrete particles of a substance, the particles being the dispersed phase, and a substance forming a continuous or external phase. In this invention, the continuous phase is the organic solvent or water and at least a portion of the polyurethane exists as discrete particles. By "dispersion," it is also meant that the entire polyurethane polymer does not need to be insoluble in organic solvent or water.

The PU-based dispersion may further comprise at least one additive such as a wetting agent or a surfactant. The at least one additive represents 0.1 to 2% wt of the total weight of the composition.

For example, the wetting agent is Envirogem® 360 from Air products and represents 0.4% wt, or Tegowet 270 from Evonik and represents 0.5% wt.

In a preferred execution of this embodiment, the PU-based dispersion comprises 33% wt of aliphatic urethane and 67% wt of water and has a viscosity Brookfield of 100 mPa·s measured at 25° C. and a density of dispersion of 1.02 kg/l at 20° C. As an example, the PU-based dispersion comprises Neorez® R600 from DSM.

In another preferred execution of this embodiment, the PU-based dispersion comprises 30 to 35% wt of of aliphatic urethane and 65 to 70% wt of water and has a viscosity (BS4 cup 4, at 25° C.) of 23 to 28 seconds, and a volumetric Density of 0.9 to 1.0 g/cm³. As an example, the PU-based dispersion comprises Liofol PR59-160 from Henkel.

In a another preferred embodiment, the coating layer 3 is a polyolefin-based film. The film is preferably obtained from a composition comprising ethylene copolymers. The co-polymers are either acrylic or methacrylic acid polymers. The co-polymers may also be terpolymers.

Preferably, the coating layer 3 comprises an ethylene-methacrylic acid copolymer, preferably having a MFI of 2.5 and a melting point of 101° C., or an ethylene-acrylic acid terpolymer, preferably having a MFI of 35 and a melting point of 87° C. As an example, ethylene-acid copolymer may be Nucrel 0903 from DuPont and ethylene-acid-acrylate terpolymer may be Bynel 2022 from DuPont After been dried, the coating layer 3 has a thickness of at least 5 µm, preferably between 5 and 70 µm, more preferably between 10 µm and 50 µm, and even more preferably of around 20 µm.

The surface tension of the coating layer 3, measured after drying, is comprised between 34 dyne/cm (34 mN/m) and 38 dyne/cm (38 mN/m).

The surface tension is measured at room temperature, about 23° C., using calibrated pens, for example the ones of Arcotest, comprising calibrated liquids having a known and specific surface tension comprised between 30 and 50 Dyne/cm (mN/m). Using the pens, a line of calibrated liquid is drawn on the coating layer 3. The surface tension corresponds to the value of the calibrated liquid if the line stays unchanged for at least 2 seconds on the surface without turning into drops.

The high surface tension is surprisingly obtained with a 5 to 100 µm layer and allows getting a good adhesion of the decorative layer 5 to the support layer 2 even using a 5 µm layer of coating layer 3.

The decorative layer 5 is made of a single composition or made of several compositions. The decorative layer 5 composition, or compositions, comprise any suitable pigment or pigments combination. Preferably, the composition is an ink, a PU compatible ink or a polyolefin compatible ink or a composition comprising such inks. More preferably, it is a water-based ink. For example, the ink is a water-dispersible ink provided by Penn Color inc or Sun chemical, or the one disclosed in EP1995057. For example, the PU-compatible ink is DU2740 PU ink from Sun chemical, or 39C653 clear laminating ink from Penn Color comprising 36B440 ink (containing black pigments) and/or 36R281 ink (containing red pigments) and/or 36S443 ink (containing blue pigments) and/or 36Y237 ink (containing yellow pigments), or a polyolefin based ink as disclosed in EP 1995057.

The decorative layer 5 may comprise one or several layers, successive layers, of the above mentioned composition or compositions.

The surface covering 1 may further comprise a supplementary coating layer 6 laid over the decorative layer 5 which is substantially identical, and having preferably a composition substantially identical, to the coating layer 3 and composition of the coating layer 3 laid between the support layer 2 and the decorative layer 5.

The use of the supplementary coating layer 6 is specially preferred in the embodiment wherein the decorative layer 5 is made of successive layers of inks.

The supplementary coating layer 6 has preferably a thickness comprised between 1 to 70 µm, preferably between 1 and 10 µm and more preferably between 1 to 5 µm.

Preferably, the supplementary coating layer 6 have a thickness substantially equivalent or equal to the thickness of the coating layer 3. This embodiment is particularly preferred when a wear layer 4 a highly neutralised ionomer based film is used, for example a (ionomer—EMAA) based film.

The wear layer 4 is made of any suitable composition which is compatible with the decorative layer 5 composition, preferably a wear layer 4 having an adhesion with the decorative layer 5 higher than 50 N/50 mm.

The wear layer 4 is either a monolayer or multilayer based on an acid polymer, preferably based on Ethylen Methacrylic acid or Ethylen Acrylic Acid co-monomer or terpolymer.

Preferably, the wear layer 4 is a multiple layer of non-neutralized acid polymer. This embodiment is preferred in particular when the decorative layer 5 is in contact of non-neutralized acid polymer layer.

However, the wear layer 4 could also be a monolayer or multilayer based on an acid polymer neutralized or partially neutralised to form an ionomer.

The wear layer 4, being either a monolayer or a multilayer, has a thickness comprised between 100 and 800 µm, preferably between 150 and 300 µm.

Depending on the wear properties the wear layer 4 should have, each layer, forming the wear layer 4 in the multilayer embodiment, could have a thickness comprised between 100 and 800 µm.

The surface covering 1 according to the invention may further comprise over the wear layer 4, a varnish layer 7.

Preferably, the composition of the varnish layer 7 comprises curable polyurethane which is cured by UV and/or by heat, to form a three-dimensional structure allowing to get the wear and stain resistance properties.

The varnish layer 7 has preferably a thickness comprised between 5 and 25 µm.

The surface covering according to the invention may be a wall or a floor covering.

Examples

In all the examples (comparative examples and examples according to the invention), the surface covering 1 comprises:
- a 1700 µm thick support layer 2 as described in tables 1 to 4,
- a decorative layer 5 comprising a PU-compatible ink (DU2740 PU clear laminating ink from Sun chemical or 39C653 clear laminating ink from Penn Color) or a polyolefin based ink as disclosed in EP 1995057),
- a 200 µm thick transparent wear layer 4 made of two coextruded films, the first film being a 160 µm thick film made of an acid-based polymer neutralized or partially neutralised to form an ionomer, the second being a 40 µm thick EMAA-based film, the wear layer 4 being applied at around 180° C. for around 120 seconds,
- a 5 µm thick PU-based varnish layer 7.

The different support layers 2 of the examples are given in tables 1 to 4. They have a surface tension of 28 mN/m. Phr means "percentage by weight of the total amount of the polymers".

TABLE 1

Support Layer 2.

| Support layer | Type | Name | Supplier | phr | % wt |
|---|---|---|---|---|---|
| A | VLDPE | Clearflex CLDO | Polimeri | 30 | |
|   | EVA | Escorene 218 | ExxonmMobil | 30 | |
|   | POE | Tafmer DF 710 | Mitsui | 30 | |
|   | POE | Fusabond 525 | DuPont | 10 | |
|   | Total | | | 100 | 23.8 |
|   | CaCO₃ Additives | Craie VS 35 | Omya | 300 | 71.4 |
|   | Mineral oil | Gulfpar 150 | Gulf | 18 | |
|   |   | Stearic Acid | Oleofina | 1.8 | |
|   | Antioxidant | Irganox 1010 | Ciba | 0.2 | |
|   | Total | | | 20 | 4.8 |

TABLE 2

Support Layer 2.

| Support layer | Type | Name | Supplier | phr | % wt |
|---|---|---|---|---|---|
| B | POE | Exact 48201 | ExxonMobil | 55 | 23.8 |
|   | EVA | Escorene 218 | ExxonMobil | 30 | |
|   | POE | Fusabond 525 | DuPont | 15 | |
|   | Total | | | 100 | |
|   | CaCO₃ Additives | Craie VS 35 | Omya | 300 | 71.4 |

TABLE 2-continued

Support Layer 2.

| Support layer | Type | Name | Supplier | phr | % wt |
|---|---|---|---|---|---|
|   | Mineral oil | Gulfpar 150 | Gulf | 18 | |
|   |   | Stearic Acid | Oleofina | 1.8 | |
|   | Antioxidant | Irganox 1010 | Ciba | 0.2 | |
|   | Total | | | 20 | 4.8 |

TABLE 3

Support Layer 2.

| Support layer | Type | Name | Supplier | phr | % wt |
|---|---|---|---|---|---|
| C | SEBS | Europrene Sol TH 2311 | Polimeri | 30 | |
|   | VLDPE | Clearflex CLDO | Polimeri | 30 | |
|   | EVA | Escorene 218 | ExxonMobil | 30 | |
|   | POE | Fusabond 525 | DuPont | 10 | |
|   | Total | | | 100 | 23.8 |
|   | CaCO₃ Additives | Craie VS 35 | Omya | 300 | 71.4 |
|   | Mineral oil | Gulfpar 150 | Gulf | 18 | |
|   |   | Stearic Acid | Oleofina | 1.8 | |
|   | Antioxidant | Irganox 1010 | Ciba | 0.2 | |
|   | Total | | | 20 | 4.8 |

TABLE 4

Support Layer 2.

| Support layer | Type | Name | Supplier | phr | % wt |
|---|---|---|---|---|---|
| D | SIS | Europrene Sol TE 9326 | Polimeri | 20 | |
|   | POE | Exact 48201 | ExxonMobil | 35 | |
|   | EVA | Escorene 218 | ExxonMobil | 30 | |
|   | POE | Fusabond 525 | DuPont | 15 | |
|   | Total | | | 100 | 23.8 |
|   | CaCO₃ Additives | Craie VS 35 | Omya | 300 | 71.4 |
|   | Mineral oil | Gulfpar 150 | Gulf | 18 | |
|   |   | Stearic Acid | Oleofina | 1.8 | |
|   | Antioxydant | Irganox 1010 | Ciba | 0.2 | |
|   | Total | | | 20 | 4.8 |

COMPARATIVE EXAMPLES

The comparative examples comprise either a support layer 2 of type A, B, C or D, but do not comprise neither a coating layer 3 nor a supplementary coating layer 6. A first group (CI) do not comprise a Corona treatment of the support layer 2, while in a second group (CII) a Corona treatment is performed over the support layer 2 allowing to get a surface tension of 38 mN/m. The decorative layer 5, comprising either a PU based ink-1 having a surface tension of 30 mN/m, a PU based ink-2 having a surface tension of 34 mN/m or a polyolefin-based ink having a surface tension of 30 mN/m, covers substantially all the surface of the support layer 2 in substantially one layer.

Examples According to the Invention

The first group of examples according to the invention comprises a support layer 2 type A being submitted to a Corona treatment, a coating layer 3 being a film of a coalesced PU-based dispersion having a thickness (after being dried at 130° C. for 20 seconds) of 20 µm and having a surface tension of 38 mN/m. The decorative layer 5, being a PU-based ink having a surface tension of either 30 or 34 mN/m, covers around 100% of the surface of the support layer 2.

The second group of examples according to the invention is identical to the first group of example, with the exception that decorative layer 5 covers around 30% of the surface of the support layer 2.

The third group of examples according to the invention comprises a support layer 2 of type A, B, C or D, submitted to a Corona treatment, a coating layer 3 being a film of a coalesced PU-based dispersion, having a surface tension of 38 mN/m and having a thickness (after being dried at 130° C. for 20 seconds) of 20 µm and a supplementary coating layer 6 being a film of a coalesced PU-based dispersion having a surface tension of 38 mN/m and having a thickness (after being dried at 130° C. for 20 seconds) of 20 µm. The decorative layer 5 covers substantially all the support layer.

The fourth group of examples according to the invention comprises a support layer of type A which has been submitted to a corona treatment, a coating layer 3 being a film of a coalesced PU-based dispersion, having a surface tension of 38 mN/m and having a thickness (after being dried at 130° C. for 20 seconds) comprised between 5 and 70 µm, a decorative layer 5 being a PU-based ink-1 having a surface tension of 30 mN/m, and a supplementary coating layer 6 being a film of a coalesced PU-based dispersion having a surface tension of 38 mN/m and having a thickness (after being dried at 130° C. for 20 seconds) comprised between 1 and 70 µm. The decorative layer 5 covers substantially all the support layer.

The fifth group of examples according to the invention is the same as the fourth group with the exception that the PU-based ink of the decorative layer 5 has a surface tension of 34 mN/m.

The sixth group of examples according to the invention comprises a support layer of type A which has been submitted to a corona treatment, a coating layer 3 being an ethylene-acid copolymer-based film having a surface tension of 37 mN/m and having a thickness (after being dried at 130° C. for 20 seconds) comprised between 40 and 50 µm, a decorative layer 5 being a polyolefin ink having a surface tension of 30 mN/m, and a supplementary coating layer 6 being an ethylene-acid copolymer film having a surface tension of 37 mN/m and having a thickness (after being dried at 130° C. for 20 seconds) comprised between 30 and 50 µm. The decorative layer 5 covers substantially all the support layer.

The seventh group of examples according to the invention comprises a support layer of type A which has been submitted to a corona treatment, a coating layer 3 being an ethylene-acid-acrylate terpolymer-based film having a surface tension of 34 mN/m and having a thickness (after being dried at 130° C. for 20 seconds) comprised between 40 and 50 µm, a decorative layer 5 being a polyolefin ink having a surface tension of 30 mN/m, and a supplementary coating layer 6 being an ethylene-acid-acrylate terpolymer film having a surface tension of 34 mN/m and having a thickness (after being dried at 130° C. for 20 seconds) comprised between 30 and 50 µm. The decorative layer 5 covers substantially all the support layer.

Results

The adherence between the wear layer 4 or the decorative layer 5 and the support layer 2 are measured in a peeling test performed at 180° by delamination of the wear layer 4 and the support layer 2.

The adherence measured between the wear layer 4 or the decorative layer 5 and the support layer 2 for all comparative examples (CI and CII), for all types of support layer, are of 10 N/50 mm, and the decorative layer presents a large number au visual defects. The Corona treatment of the support layer, before the decorative layer 5 is applied, decreases the number of visuals defects of said decorative layer 5, however, the adhesion is low.

For the examples of the first group, the adherence, measured between the wear layer 4 and the decorative layer 5, are of 30 N/50 mm, 55 N/50 mm for the examples of the second group, and 85 N/50 mm, no matter the type of support layer 2 for the examples of the third group.

Therefore, compared to the comparative examples, it appears that the presence of the coating layer 3 enhance the adherence between the wear layer 4 and the PVC-free support layer 2 when the decorative layer 5 covers partially or substantially all the surface of the support layer 2. This adherence is also enhanced by using a supplementary coating layer 6.

In comparison to the comparative examples, the examples of the first to the third group present no, or less, visuals defects of the decorative layer 5. Furthermore, the visual aspect of decorative layer 5 is maintained (not affected) by the presence of the supplementary coating 6.

For the examples of the fourth group, the adherence measured are comprised between 50 and 85 N/50 mm (table 5).

TABLE 5

PU-based coating layers.

| | coating layer (µm) | PU-based Ink-1 (number of layers) | Supplementary coating (µm) | Quality of the decorative layer | Adhesion (N/50 mm) |
|---|---|---|---|---|---|
| 1 | 70 | 1 | 70 | Good | 85 |
| 2 | 70 | 1 | 10 | Good | 85 |
| 3 | 70 | 2 | 10 | Good | 85 |
| 4 | 50 | 1 | 50 | Good | 85 |
| 5 | 50 | 1 | 10 | Good | 85 |
| 6 | 50 | 2 | 50 | Good | 85 |
| 7 | 50 | 1 | 10 | Good | 85 |
| 8 | 20 | 1 | 20 | Good | 85 |
| 9 | 20 | 1 | 10 | Good | 85 |
| 10 | 20 | 1 | 5 | Good | 85 |
| 11 | 20 | 1 | 3 | Good | 85 |
| 12 | 20 | 1 | 1 | Good | 85 |
| 13 | 20 | 3 | 20 | Good | 85 |
| 14 | 20 | 3 | 5 | Good | 85 |
| 15 | 20 | 2 | 3 | Good | 85 |
| 16 | 20 | 1 | 1 | Good | 75 |
| 17 | 10 | 1 | 10 | Good | 85 |
| 18 | 10 | 1 | 5 | Good | 85 |
| 19 | 10 | 1 | 3 | Good | 75 |
| 20 | 10 | 1 | 1 | Good | 75 |
| 21 | 10 | 2 | 5 | Good | 85 |
| 22 | 5 | 1 | 5 | Good | 85 |
| 23 | 5 | 1 | 3 | Good | 60 |
| 24 | 5 | 1 | 1 | Good | 55 |
| 25 | 5 | 2 | 5 | Good | 50 |

Compared to first group examples, it appears that the adherence between the wear layer 4 and the support layer 2 is enhanced by using a supplementary coating layer 6 having a thickness comprised between 1 to 20 μm. More generally, for a 5 to 70 μm thick coating layer 3, a 1 to 70 μm thick supplementary coating layer 6 enhance the adherence between the wear layer 4 and the support layer 2.

However, for a 5 μm thick coating layer 3, it appears that the adherence is enhanced as the thickness of the supplementary coating layer 6 increases. For such a coating layer 3 thickness it appears also that increasing the number of layers forming the decorative layer 5 reduce slightly the adherence between the wear layer 4 and the support layer 2.

Furthermore, the visual aspect of decorative layer 5 is maintained (not affected) by the presence of a supplementary coating 6.

Generally, an adhesive coating presents a certain "mobility", or interpenetration, between the layers it has to stick. Therefore, one could expect that printing a decorative layer onto such "mobile" coating would lead to a decrease of the quality of the printed decorative pattern. However, surprisingly the printing quality of the decorative layer 5 was enhanced in the present invention.

For the examples of the fifth group, the adherence measured are comprised between 50 and 85 N/50 mm (table 6).

TABLE 6

PU-based coating layers.

| | coating layer (μm) | PU-based Ink-2 (number of layers) | Supplementary coating (μm) | Quality of the decorative layer | Adhesion (N/50 mm) |
|---|---|---|---|---|---|
| 26 | 70 | 2 | 10 | Good | 85 |
| 27 | 50 | 2 | 50 | Good | 85 |
| 28 | 20 | 1 | 20 | Good | 85 |
| 29 | 20 | 1 | 10 | Good | 85 |
| 30 | 20 | 1 | 5 | Good | 85 |
| 31 | 20 | 1 | 3 | Good | 85 |
| 32 | 20 | 1 | 1 | Good | 85 |
| 33 | 20 | 3 | 20 | Good | 85 |
| 34 | 20 | 3 | 5 | Good | 85 |
| 35 | 20 | 2 | 3 | Good | 85 |
| 36 | 20 | 1 | 1 | Good | 75 |
| 37 | 10 | 2 | 5 | Good | 85 |
| 38 | 5 | 1 | 5 | Good | 85 |
| 39 | 5 | 1 | 3 | Good | 60 |
| 40 | 5 | 1 | 1 | Good | 55 |
| 41 | 5 | 2 | 5 | Good | 50 |
| 42 | 5 | 2 | 3 | Good | 45 |
| 43 | 5 | 2 | 1 | Good | 40 |
| 44 | 5 | 3 | 3 | Good | 40 |
| 45 | 5 | 3 | 1 | Good | 35 |
| a | 3 | 3 | 1 | Good | 10 |
| b | 3 | 2 | 1 | Good | 15 |
| c | 3 | 1 | 1 | Good | 15 |
| d | 3 | 3 | 1 | Good | 15 |

In tables 5 and 6, the PU-based ink-1 is DU2740 PU ink from Sun chemical, having a surface tension of 30 Dyne/cm (mN/m), the PU-based ink-2, having a surface tension of 34 Dyne/cm (mN/m), comprises 39C653, 36R281 (containing red pigments), 36B440 ink (containing black pigments), 36Y237 ink (containing yellow pigments).

As already mention for the results shown in table 5, from table 6 it appears that, for a 5 μm thick coating layer 3, the increase of the number of layers forming the decorative layer 5 reduces slightly the adherence between the wear layer 4 and the support layer 2. The adherence is strongly decreased when the coating layer 3 has a thickness of 3 μm (examples a to d).

From tables 5 and 6, it appears that the visual aspect of the decorative layer 5 and the adhesion between the wear layer 4 and the support layer 2 are equivalent using either an PU-based ink having a surface tension of 34 Dyne/cm or having a surface tension of 30 Dyne/cm.

For the examples of the sixth group, the adherence measured are of 85 N/50 mm (table 7).

TABLE 7

Polyolefin-based coating layers.

| | coating layer (μm) | Polyolefin-based Ink (number of layers) | Supplementary coating (μm) | Quality of the decorative layer | Adhesion (N/50 mm) |
|---|---|---|---|---|---|
| 46 | 50 | 3 | 50 | Good | 85 |
| 47 | 50 | 3 | 40 | Good | 85 |
| 48 | 50 | 1 | 40 | Good | 85 |
| 49 | 40 | 1 | 40 | Good | 85 |
| 50 | 40 | 2 | 40 | Good | 85 |
| 51 | 40 | 1 | 30 | Good | 85 |
| 52 | 40 | 2 | 30 | Good | 85 |
| 53 | 40 | 3 | 30 | Good | 85 |

For the examples of the seventh group, the adherence measured are of 85 N/50 mm (table 8).

TABLE 8

Polyolefin-based coating layers.

| | coating layer (μm) | Polyolefin-based Ink (number of layers) | Supplementary coating (μm) | Quality of the decorative layer | Adhesion (N/50 mm) |
|---|---|---|---|---|---|
| 54 | 50 | 3 | 50 | Good | 85 |
| 55 | 50 | 3 | 40 | Good | 85 |
| 56 | 50 | 1 | 40 | Good | 85 |
| 57 | 40 | 1 | 40 | Good | 85 |
| 58 | 40 | 2 | 40 | Good | 85 |
| 59 | 40 | 1 | 30 | Good | 85 |
| 60 | 40 | 2 | 30 | Good | 85 |
| 61 | 40 | 3 | 30 | Good | 85 |

In tables 7 and 8, the polyolefin-based ink being the one disclosed in EP1995057, having a surface tension of 30 Dyne/cm (mN/m).

From tables 7 and 8, it appears that the visual aspect of the decorative layer 5 and the adhesion between the wear layer 4 and the support layer 2 are equivalent using either a polyolefin-based coating layer 3 having a surface tension of 37 Dyne/cm (mN/m) or having a surface tension of 34 Dyne/cm (mN/m). Furthermore, it appears that the visual aspect of the decorative layer 5 and the adhesions are equivalent to the ones of PU-based coating layers.

The process to produce the surface covering according to the invention comprise the step of providing a PVC-free support layer 2, providing a coating layer composition, forming over the support layer 2 a coating layer 3 having a thickness of at least 5 μm and a surface tension equal or higher to the surface tension of the decorative layer 5, applying over said coating layer 3 a decorative layer 5, and applying over the decorative layer 5 a transparent wear layer 4.

The PVC-free support layer 2, coating layer 3, decorative layer 5 and transparent wear layer 4 are those described for the surface covering 1 according to the invention.

The coating layer 3 is a polymer-based film, either a liquid film obtained from an emulsion or dispersion of a polymer coated at room temperature or obtained from a polymer in solution in a solvent coated at room temperature, or either a hot liquid polymer, or either a film calendered or extruded.

For the embodiments wherein a liquid coating layer composition is used, the composition is preferably applied to form, before a drying step, a layer having a thickness of at least 15 µm, preferably between 50 and 150 µm and more preferably around 60 µm. After the drying step, the coating layer 3 has a thickness of at least 5 µm, preferably between 20 and 50 µm and more preferably around 20 µm.

In the preferred embodiment wherein the coating layer composition comprises a PU-based dispersion, the coating layer 3 is formed by the coalescence of said PU-based dispersion, i.e. the discreet PU particles combine to form a continuous film. The a coalescence is preferably performed at a temperature comprised between 20 and 130° C., more preferably at 100° C.

For all the embodiments, the drying step of the coating layer composition is performed by any suitable means, but preferably by an infra-red heating device or an oven.

For the embodiments wherein the coating layer 3 is formed from a film, the film can be cold laminated or hot coated laminated on the support layer 2.

The decorative layer 5 is applied by printing a single composition or several compositions in successive layers.

The process according to the invention may further comprises the step of applying over the decorative layer 5 a supplementary coating 6. This supplementary coating 6 have substantially the same composition and characteristics as the coating layer 3.

Preferably, the coating layer composition is applied to form a supplementary coating 6 having a thickness of 1 to 70 µm, 3 to 20 µm, more preferably 5 to 10 µm.

For the embodiment using a coating composition, the process may further comprise a drying step of the supplementary coating composition to form the supplementary coating 6. The drying step could be performed by a simple contact with dry air in the embodiments wherein the layers forming the surface covering 1 have a low thickness.

The process according to the invention may further comprise the step of applying over the wear layer 4 a varnish layer 7, preferably a PU-based varnish layer, more preferably having a composition as described for the surface covering 1 according to the invention. The PU-based varnish layer is cured by UV and/or action of heat.

The terms "applying" and "applied" should be understood as covering any suitable process step wherein a layer is formed onto, or put in contact to, another layer. The layers may be formed by coating a layer with a suitable composition or by forming, from any suitable composition, a layer which is calendered onto another layer.

The cohesion of the different layers forming the surface covering 1 is obtained either by heating, for example at 150° C. during 2 minutes, and/or followed by pressing, for example by embossing, the whole surface covering 1.

Preferably, the process according to the invention further comprises at least one corona treatment before applying any one of the layers forming the surface covering according to the invention.

A corona treatment may be performed on the surface of the support layer 2 before applying the coating layer 3 and/or on the wear layer 4 before applying the varnish layer 7.

The process according to the invention may further comprise a step of embossing the wear layer 4 or the varnish layer 8.

The process according to the invention may further comprise a step of cutting the surface covering 1 into tiles.

The process according to the invention is preferably a continuous process with a line speed of around 15 m/min.

The invention claimed is:

1. A synthetic multilayer wall or floor surface covering comprising:
    a PVC-free support layer, having a thermoplastic composition and a thickness comprised between 500 µm and 3700 µm;
    a decorative layer made of polyurethane compatible ink;
    a transparent wear layer; and
    a polyurethane-based coating layer between said PVC-free support layer and said decorative layer, said polyurethane-based coating layer having a thickness of at least 5 µM and a surface tension equal to or higher than the surface tension of the decorative layer.

2. The multilayer wall or floor surface covering according to claim 1, wherein the polyurethane-based coating layer has a surface tension which is at least 2 dyne/cm (2 mN/m) higher than the surface tension of the decorative layer.

3. The multilayer wall or floor surface covering according to claim 1, wherein the polyurethane-based coating layer has a surface tension comprised between 34 dyne/cm (34 mN/m) and 38 dyne/cm (38 mN/m).

4. The multilayer wall or floor surface covering according to claim 1, wherein the polyurethane-based coating layer comprises coalesced polyurethane (PU) particles.

5. The multilayer wall or floor surface covering according to claim 1, wherein the thermoplastic composition of the PVC-free support layer comprises a styrenic thermoplastic elastomer or a polyolefin resin.

6. The multilayer wall or floor surface covering according to claim 1, further comprising a supplementary coating layer between the decorative layer and the transparent wear layer, said supplementary coating layer having a thickness of at least 1 mm and a surface tension equal to or higher than the surface tension of the decorative layer.

7. The multilayer wall or floor surface covering according to claim 6, wherein the polyurethane-based coating layer has a thickness of 5 µm and the supplementary coating layer has a thickness of 1 µm.

8. The multilayer wall or floor surface covering according to claim 6, wherein the polyurethane-based coating layer has a thickness of 10 µm and the supplementary coating layer has a thickness of 3 µm.

9. The multilayer wall or floor surface covering according to claim 1, further comprising a varnish layer.

10. A process to product the synthetic multilayer wall or floor surface covering according to claim 1, said method comprising the steps of:
    providing a PVC-free support layer having a thermoplastic composition and a thickness between 500 µm and 3700 µm;
    providing a polyurethane-based coating layer composition,
    forming a polyurethane-based coating layer having a thickness of at least 5 µm and a surface tension equal or higher than the surface tension of the decorative layer, by applying said polyurethane-based coating layer composition over said PVC-free support layer and drying said polyurethane-based coating layer composition at a temperature comprised between 20 and 130° C. or by extruding a polyurethane-based coating layer composition to form a film and applying said film over said PVC-free support layer;
    applying over said polyurethane-based coating layer a decorative layer made of polyurethane compatible ink;

applying over said decorative layer a transparent wear layer.

11. The process according to claim 10, wherein the polyurethane-based coating layer has a surface tension comprised between 34 dyne/cm (34 mN/m) and 38 dyne/cm (38 mN/m).

12. The process according to claim 10, wherein the polyurethane-based coating layer is formed by the coalescence of a PU-based dispersion.

13. The process according to claim 10, further comprising the step of forming a supplementary coating layer having a thickness of at least 1 μm and a surface tension equal to or higher to the surface tension of the decorative layer, by applying a supplementary coating layer composition over the decorative layer and drying said supplementary coating layer composition at a temperature comprised between 20 and 130° C. or by extruding a supplementary coating layer composition to form a film and applying said film over the decorative layer.

14. The process according to claim 10, further comprising the step of applying a varnish layer over the transparent wear layer.

15. The process according to claim 10, further comprising the step of performing a corona treatment on the PVC-free support layer before forming the polyurethane-based coating layer and/or on the transparent wear layer before applying the varnish layer.

* * * * *

UNITED STATES PATENT AND TRADEMARK OFFICE
CERTIFICATE OF CORRECTION

PATENT NO. : 9,624,665 B2  
APPLICATION NO. : 14/388150  
DATED : April 18, 2017  
INVENTOR(S) : Pierre Bastin et al.

Page 1 of 1

It is certified that error appears in the above-identified patent and that said Letters Patent is hereby corrected as shown below:

In the Claims

Column 14, in Line 11 of Claim 1, delete "μM" and insert --μm--

Column 15, in Line 15 of Claim 10, delete "130°" and insert --130--

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*